Figure 1:
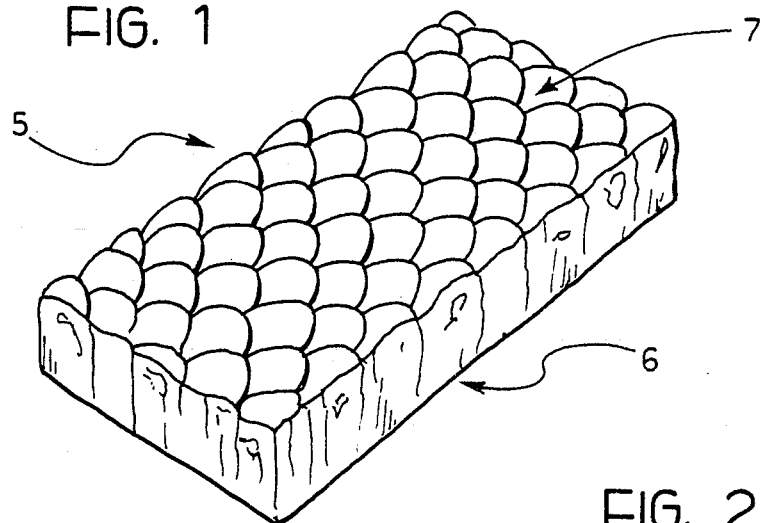

United States Patent [19]

Ferrero

[11] Patent Number: 4,826,697
[45] Date of Patent: May 2, 1989

[54] METHOD FOR THE PREPARATION OF A BAKERY PRODUCT

[75] Inventor: Pietro Ferrero, Brussels, Belgium
[73] Assignee: Ferrero S.p.A., Alba, Italy
[21] Appl. No.: 879,429
[22] Filed: Jun. 27, 1986
[30] Foreign Application Priority Data

Jul. 5, 1985 [IT]  Italy ............................... 67626 A/85

[51] Int. Cl.$^4$ ............................................. A21D 13/00
[52] U.S. Cl. .................................... 426/281; 426/283; 426/512
[58] Field of Search ................. 426/94, 283, 281, 512, 426/390, 503, 516

[56] References Cited

U.S. PATENT DOCUMENTS

| | | | |
|---|---|---|---|
| 1,319,899 | 10/1919 | Rafert .................................... | 426/94 |
| 1,824,594 | 9/1931 | Conforto . | |
| 2,234,526 | 3/1941 | Guldbeck ........................... | 426/503 |
| 2,619,051 | 11/1952 | Rice .................................... | 426/503 |
| 3,465,693 | 9/1969 | Lopata ................................ | 426/281 |
| 3,572,259 | 3/1971 | Hayashi ................................ | 426/94 |
| 4,002,091 | 1/1977 | White ..................................... | 83/4 |
| 4,044,166 | 8/1977 | Koizumi .............................. | 426/560 |
| 4,159,348 | 1/1979 | Dogliotti ............................ | 426/23 |
| 4,209,536 | 6/1980 | Dogliotti ........................... | 426/281 |
| 4,362,751 | 12/1982 | Dogliotti ............................. | 426/94 |
| 4,613,508 | 9/1986 | Shishido ............................... | 426/94 |

FOREIGN PATENT DOCUMENTS

| | | | |
|---|---|---|---|
| 115450 | 6/1986 | Japan .................................... | 426/94 |
| 952655 | 3/1964 | United Kingdom . | |

OTHER PUBLICATIONS

Family Circle Illustrated Library of Cooking, 1972, vol. 2, pp. 211–213, Rockville House Publishing, Rockville Center, New York.
French Search Report for FR 86 09 660.

Primary Examiner—Donald E. Czaja
Assistant Examiner—Carolyn Paden
Attorney, Agent, or Firm—Bernard, Rothwell & Brown

[57] ABSTRACT

A dough mixture for baking is divided into individual drops, or knubs, which are deposited on a baking sheet so as to form a flat array in which each knub is spaced a short distance from the other knubs surrounding it. During baking, as a result of leavening, each knub becomes fused to the adjacent knubs so as to form a "slab" of baked product with a cellular (or alveolar) structure in which each cell includes a soft inner portion and a relatively firm outer portion welded at least around its periphery to the outer portions of the adjacent cells.

4 Claims, 2 Drawing Sheets

METHOD FOR THE PREPARATION OF A BAKERY PRODUCT

The present invention relates, in general, to bakery products, this general term being understood to mean all those products which are made by the baking of a dough or paste prepared by mixing flour with a liquid, with the possible addition of other ingredients such as fats, proteins and flavouring additives.

Products of this kind are currently used in the large-scale manufacture of filled pastry products, both sweet and savoury, as well as for direct consumption at the table.

As a result of the baking, the dough normally increases in volume, this being more obvious in the case of doughs containing leavening agents, as in the case of ordinary bread.

The baking causes a more or less firm skin (crust) of light or brownish colour, to form on the outer surface of the product, enclosing an inner, generally-soft (crumb) portion.

The presence of the skin or crust can cause certain difficulties in the division of the product for consumption. When cutting utensils are not available, the product must be broken or torn with the hands, and the relative hardness of the crust makes it rather difficult to divide the product exactly where desired.

The relative hardness of the crust also creates problems when the bakery product is used to prepared filled products having a paste or cream filling sandwiched between two slices of baked product. The presence of the crust on at least one of the slices means that, when theuser bites into the product, the filling is squashed correspondingly. This squashing may even cause the filling to be squeezed out, soiling the fingers of the consumer who is holding the product in his hand (and possibly even his clothing should the filling drop).

These disadvantages can be overcome by the use of a bakery product which does not have a skin or crust. In this case, however, apart from an effect which may be organoleptically disagreeable (the lump of product appears excessively soft to the consumer), other problems arise from the marked tendency of the inner portion (crumb) of the baked product, which is highly porous, to absorb liquid and moisture from the exterior.

Moreover, the absorption of moisture from the outside means that the product tends to become rubbery and difficult to eat; this tendency to soften, however, occurs even when there is a skin or crust.

The object of the present invention is, therefore, to provide a bakery product which can also be used for the manufacture of pastry products, and which has the following characteristics:

the possibility of breaking the product easily and precisely even when no cutting utensils are available;

reduced resistance to the cutting action of the consumer's teeth so as to facilitate ingestion ahd mastication, while at the same time, in the case of filled products, avoiding the effects of squashing on a cream or paste filling, good impermeability, understood as a reduced tendency to absorb moisture and liquids from the exterior.

In order to achieve this object, the present invention provides a bakery product, characterised in that it consists of a plurality of cells of baked mixture, each comprising a soft inner portion and a relatively firm outer portion peripherally welded to the outer portions of the adjacent cells.

The invention also provides a method for manufacturing a bakery product of the type specified above. This method is characterised in that it comprises, in order, the steps of:

preparing a dough or paste mixture for baking, dividing the mixture into a plurality of drops or knubs, arranging the knubs in an array in which each knub is at least partially surrounded by other knubs of dough, and baking the knubs of mixture so as to cause each knub to fuse with the adjacent knubs of mixture.

The invention hence makes it possible to produce a bakery product which has a generally cellular, or alveolar, structure.

It should be specified that the terms "cell", "cellular", etc. used in the present specification and in the following claims, refer, in general to structural elements having dimensions such that they can easily be seen by the naked eye, typically within a range of from a few mm. to 1–1.5 cm, i.e. according to the terminology adopted in the claims which follow, dimensions "of the order of a centimetre".

A bakery product having a cellular structure is described in U.S. Pats. Nos. 4,159,348 and 4,362,751 both assigned to the same assignee of the parent application. The "cells" described in these prior documents, however, have microscopic dimensions and correspond in fact to a generally spongey of porous structure substantially similar to the structure of the crumb portion of a normal table bread.

Figure 2:
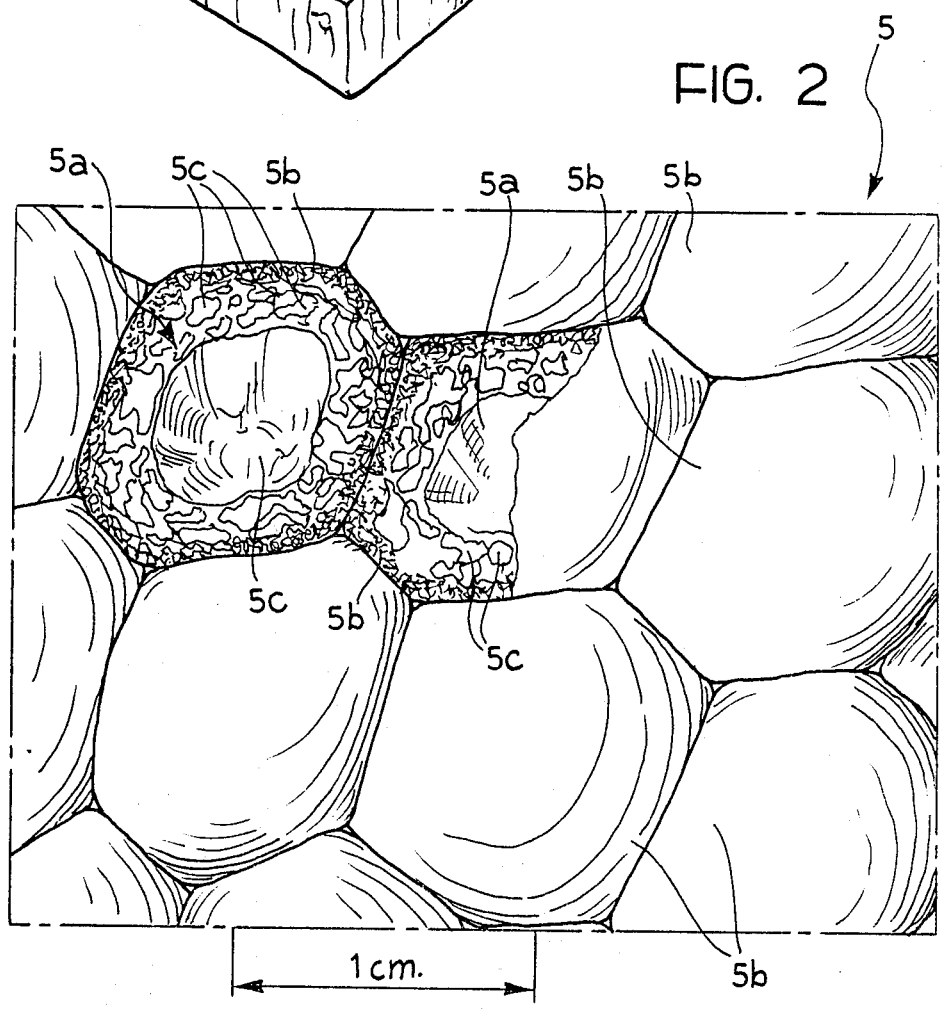
Figure 3:
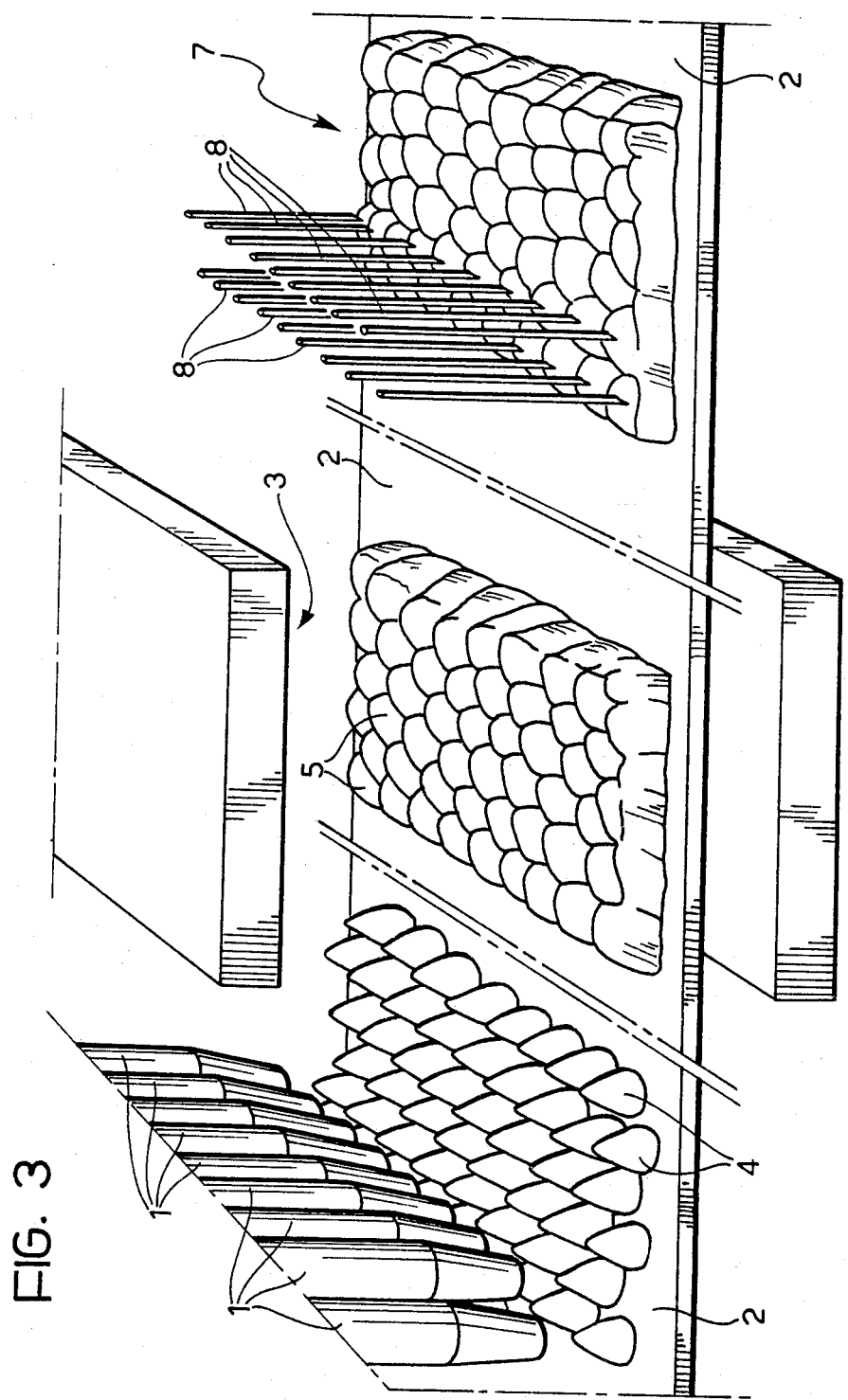

The invention will now also be described, purely by way of non-restrictive example, with reference to the accompanying drawings, in which:

FIG. 1 is a perspective view of a rectangular piece of bakery product according to the invention, FIG. 2 is a view of the product of FIG. 1, on an enlarged scale and partially sectioned in a direction corresponding to its general direction of extension, and FIG. 3 illustrates schematically the method for making the product illustrated in FIGS. 1 and 2.

In this latter figure, the nozzles of a dropping machine are generally indicated 1, these being fed almost continuously with a dough for baking.

One is considering, in general, a dough or paste mixture made by mixing a cereal flour (e.g. wheat) with water, with the possible addition of fats and usual food additives such as natural or chemical leavening agents, salt or sweeteners, protein additives etc.

The dropping machine may be of the type illustrated in the Italian Patent Application No. 68722-A/81 and in U.S. patent application Ser. No. 464,968. This machine comprises a plurality of nozzles through which precisely determined quantities (drops) of a liquid, creamy or paste-like substance can be dropped into or onto an underlying receptacle or flat support.

In the embodiment illustrated in FIG. 3, this support consists of a conveyor belt 2 which enables the metered mixture dropped from the nozzles 1 to advance to an oven 3 in which the dough is baked.

More precisely, the dough to be baked is deposited on the belt 2 in the form of knubs 4 having diameters of the order of a few mm, for example, 5–6 mm.

The nozzles 1 of the dropping machine are arranged in a zig-zag line which extends in a direction generally perpendicular to the direction of movement of the belt 2.

The distance between the outlets of adjacent nozzles 1 is slightly larger than the diameter of the knubs of dough 4 and may, for example, be of the order of 8-9 mm.

The operating rate of the dropping machine and the speed of advance of the belt 2 are regulated so that knubs of dough 4 are deposited on the belt 2 in an array with a rhomboidal (or, generally, polygonal) lattice in which each knub of dough 4 is surrounded at least on one side, by identical knubs of dough.

More particularly, the knubs 4 are deposited on the belt 2 in such a manner that they do not touch one another. During their progress through the oven 3, the knubs of dough 4 increase in size as a result of the leavening process which is completed by the end of the baking.

Owing too this increase in size and the surface hardening resulting from baking, each of the knubs 4 becomes fused with the adjacent knubs, thus giving a continuous "slab" of baked product 5.

In one possible variant of the invention, (not illustrated) the mixture to be baked is deposited on the belt 2 in the form of "continuous" drops, that is strips of mixture which extend parallel to each other and at a distance (measured between their central axes) slightly greater than the diameters of the said strips. In this case, too, during their advance through the baking oven, the strips of mixture increase in diameter, fusing together to form a continuous slab of baked product. The terms "knubs" and "cells", as used in the following claims, will therefore be understood to refer both to dough masses having (before and after baking) a generally spherical, ovoidal or at least, discrete appearance, and also to dough masses having (before and after baking) a generally elongate, strip form.

A portion (slab) of the bakery product 5 made by the method illustrated in FIG. 3 is illustrated in greater detail in FIG. 1.

The product 5 has a substantially smooth lower surface 6 and with a wavy upper surface 7, the appearance of which can be likened to that of an enlarged orange skin.

In section, in a plane parallel to its main plane of development, the slab of bakery product 5 has the type of structure illustrated schematically in FIG. 2.

In general, one is concerned with a cellular or alveolar structure in which one can distinguish individual baked dough cells, fused together across their mutually facing outer parts. More precisely, each cell comprises an inner, porous or spongy part 5a which is generally soft or yielding, surrounded by, or wrapped in an outer shell 5b of dough which is more firmly baked.

The inner, soft part 5a of each cell is essentially comparable to the crumb portion of ordinary bread. It therefore has more or less extensive cavities 5c which may even occupy a substantial proportion of the cell interior.

The outer portion 5b on the other hand is essentially comparable to the skin or crust of a soft bread.

The outer portions 5b of the cells which are fused together, thus form a fairly rigid grid which differs from the crust of ordinary bread in that it can be broken easily and precisely, even when no cutting utensils are available. Breakage of the baked product according to the invention in fact occurs locally by the detachment of the outer, facing, fused portions of two adjacent cells. The zones of connection between the outer portions of adjacent cells thus constitute more frangible sections within the structure of the product at which breakage occurs precisely, without producing crumbs or fragments.

The cellular structure gives the bread according to the invention a reduced resistance to cutting by a consumer's teeth. This reduced resistance to mastication ensures that the products can be ingested and swallowed easily, and, when the baked product is used to manufacture a filled product by the sandwiching of a layer of paste or cream between two slices of the product, it prevents the filling from being squashed and ejected from the product when the product itself is bitten into.

When the product is obtained in accordance with a variant of the invention described above—starting from adjacent strips of dough—the upper face 7 of the product will be generally striated, with grooves along the zones of fusing of adjacent strips. The characteristics of easy frangibility will, moreover, be noticeable only in the presence of shearing forces applied in the direction of extension of the strips.

When made from cereal flour, such as wheat flour, the bakery product according to the invention has a low specific weight (volume density) of the order of 0.15.

The outer portion 5b of each cell protects its soft inner portion 5a, reducing the absorption of moisture by the product and helping the product to keep for long periods.

The outer portion 5b of the cells hence has a certain degree of impermeability to liquids, and, more particularly, to edible coatings.

A paste or cream filling may thus be injected into the soft inner portion 5a of each cell, or of at least some of the cells of the baked product 5, to make a filled product in which the filling is completely protected from the exterior by the outer portions 5b of the cells. This result can be achieved by placing an injection station 7 downstream of the oven 3 (in the direction of travel of the bakery product 5 on the belt 2), the injection station being provided with an array of needles 8, the geometric distribution whereof reproduces the geometric distribution of the cells in the product 5.

The extreme tips of the needles 8, from which the filling emerges, are lowered rythmically into the median plane (in the vertical direction) of the slab of baked product 5.

A method for injecting a creamy filling into a product having an outer shell of baked pastry is described in U.S. Pat. No. 4,209,536 assigned to the same assignee of the parent application. This method can be used, with minimum variation, to fill the baken product 5 of the present invention.

In general terms, in order to form a continuous, or substantially continuous, slab of baked product, such as that indicated 5 in FIGS. 1 and 3, it suffices to select the distances between the knubs 4 which are dropped onto the support 2 in such a manner that each knub in the rows of knubs is no further from the adjacent knubs of mixture than the diameter which the knub of mixture 4 will reach during the baking phase.

Thus, in the embodiment to which FIG. 3 relates, the knubs 4, as they are sprued out from the nozzles 1, have a diameter (measured in a horizontal plane) of about 5-6 mm. Each of these, if baked separately, would be able to reach a predetermined diameter of the order of 9-10 mm. As indicated above, these parameters being considered, the knubs 4 are sprued out at a mutual spacing (measured with reference to the vertical central axes of the knubs 4) of about 8-9 mm.

The distance between the knubs of mixture deposited on the baking support 2 also influences the thickness of the slab of product 5 procured after baking.

For example, if a mixture containing leavening agents is used and the knubs 4 are dropped very close together, that is in a very crowded array, it is possible to cause the adjacent knubs to join together and form the cell structure illustrated in FIG. 2 even in the initial phase of baking when the adjacent knubs are fused together and no longer able to expand radially (horizontally), the raising of the mixture continues wholly in the vertical direction, that is in a direction perpendicular to the direction of greatest development of the slab of baked product. Thus a slab of product is obtained which is thicker than one made by dropping the knubs 4 of mixture in a sparser array.

For better understanding of the invention, one example of preparation of a bakery product according to the invention will now be described. The results of several comparison tests between the bakery product of the invention and a bakery product of the prior art are given.

EXAMPLE OF PREPARATION

A mixture was prepared by mixing a wheat flour having a protein content of 11% and an ash content of 0.5% with water. One part of the wheat flour could, optionally, be replaced by barley or rice flour.

Salt was added to this mixture, in a weight ratio of 0.4% by weight of the mixture.

Vegetable fats and eggs were also added to the mixture in a ratio of 20% by weight of the mixture.

The mixture, having the composition indicated above was fed continuously to a dropping machine of the type indicated above, kept at a temperature of about 25° C. (± 1° C.) and a 60% humidity. The dropping machine, including a zig-zag array of dropping nozzles spaced from each other by about 9 mm was disposed above a belt conveyor and operated rhythmically so as to form an array of knubs of the mixture on the belt, the array having rhomboidal meshes with diagonals of about 8×16 mm and an overall width of around 950 mm. The typical diameter of each knub of mixture, measured in the direction of movement of the belt, was chosen to be around 5 mm.

Downstream of the dropping machine the belt extended through the baking chamber of a continuous tunnel oven within which the knubs of mixture remained for about 15 minutes at a temperature of around 250° C.

As the outlet from the oven a slab of baked product was produced having a width of around 950 mm and a thickness of around 8 mm with an upper surface which was alveolar, or like orange peel.

Sectioned in a plane parallel to the major direction of development, this baked slab had a cellular structure (FIG. 2) consisting of approximately hexagonal cells having a maximum diameter of around 9 mm, separated from each other by relatively firm walls of mixture baked in a substantially uniform manner. These walls, made by the fusing together of the outer portions of adjacent cells had an apparent thickness of 0.8 mm and formed a substantially continuous grid.

Within each cell there was a soft mass of dough, also uniformly baked, though to a lesser extent than the outer portions.

The outer portion, or skin, of each cell contained pores which were practically invisible to the naked eye, whilst the soft inner portion of each cell could immediately be seen to include pores or bubbles. The interior of the cells (with the exception of cells located adjacent the edges of the baked slab) could be seen, somewhat consistently, to contain a central cavity having a diameter of a few mm.

The baked product had a specific weight of about 0.156 with a residual water content of 10%.

The baked product showed no tendency to crumble, while being easy to break along the zig-zag lines between rows of adjacent cells.

COMPARISON TEST NO. 1

In order to measure moisture-absorption characteristics, a slab of baked product according to the invention and a similarly-sized slab of a conventional bakery product, of the kind used for the manufacture of filled products sold by the Assignee under the trade name of "Brioss Albicocca", were kept next to each other in an environment having a relative humidity of 98% for a period of 24 hours.

The two slabs were then weighed: the recorded weights were 26.4 g (product of the invention) and 33 g (conventional product) compared with initial weights of 26 g and 31.7 g respectively.

These values correspond to percentage moisture absorptions of 1.54% for the product according to the invention and 4.1% for conventional products with reference to the initial weights.

This test demonstrates that the product according to the invention has substantially less tendency to absorb moisture from the exterior than the conventional product.

COMPARISON TEST NO. 2.

Two slabs of baked product having a size of 90×30×8 mm, one of a product of the invention and the other of the conventional baked product used for the comparison test no-1, were subjected to a longitudinal traction test with "Instrom" apparatus.

The apparatus was operated within a load range of 0 to 500 grams, with a spacing of 10 mm between clamps with a traction speed of 5 mm/per minute.

Breakage occurred at a load of about 167 grams for the baked product according to the invention. The slab of conventional product, on the other hand, broke under a load of about 201 grams, that is to say at a load which was about 20% greater.

This test demonstrates that the bakery product of the invention can be broken and chewed more easily than the conventional product.

COMPARISON TEST NO. 3

A coating of chocolate was sprayed onto the upper surface of two slabs—of baked product according to the invention and a conventional baked product such as that used in the comparison tests nos. 1 and 2, respectively—identical to those used in the comparison test no. 1, the spraying being stopped as soon as the coating appeared to be without visible gaps.

The quantity of coating deposited on the surface of the slab was then determined from a measurement of the increase in weight of the slab. In the case of the product according to the invention, a complete coating was obtained with about 11 grams of chocolate, whereas in order to obtain the same result with the conventional product, approximately 20 grams of chocolate had to be sprayed on.

This test demonstrates that, on average, the product according to the invention, requires, for coverage, about 50% of the quantity of chocolate required for covering the conventional product.

I claim:

1. A method for manufacturing a bakery product comprising, in order, the steps of:
   preparing a mass of dough mixture for baking,
   providing a flat support for an array of knubs of mixture,
   providing a dropper source for the mass of mixture,
   providing relative movement between the flat support and the dropping source in the general direction of the flat support,
   operating the dropping source so as to divide the mixture into a plurality of individual knubs for forming cells when baked having diameters of the order of a centimeter, which knubs of mixture are arranged on the flat support in an array in which each knub is at least partially surrounded by other knubs of mixture, the knubs being positioned for fusing peripherally with adjacent knubs at outer portions thereof, and
   baking the knubs of mixture so as to cause each knub to fuse to the adjacent knubs of mixture to form a bakery product comprised of a plurality of cells of baked mixture, which cells have diameters of the order of a centimeter, each cell comprising a soft inner portion and a relatively firm outer portion, the firm outer portion of the cells being fused peripherally to the firm outer portions of adjacent cells to form a continuous grid, the peripherally fused outer portions of adjacent cells comprising connection zones that constitute more frangible sections within the structure of the bakery product at which breakage of the product may occur during consumption of the product.

2. A method according to claim 1, including the step of injecting a soft filling into at least some of the said cells after said baking.

3. A method according to claim 1, wherein said knubs of mixture are arranged in an array in which each knub is spaced from the knubs surrounding it, whereby contact between the knubs of mixture is achieved only during baking.

4. A method for manufacturing a bakery product comprising, the steps of:
   preparing a mass of dough mixture for baking,
   providing a support for an array of knubs of mixture,
   providing a dropping source for the mass of mixture,
   operating the dropping source so as to divide the mixture into a plurality of individual knubs for forming cells when baked having diameters of the order of a centimeter, which knubs of mixture are arranged on the support in an array in which each knub is at least partially surrounded by other knubs of mixture, the knubs being positioned for fusing peripherally with adjacent knubs at outer portions thereof, and
   baking the knubs of mixture so as to cause each knub to fuse to the adjacent knubs of mixture to form a bakery product comprised of a plurality of cells of baked mixture, which cells have diameters of the order of a centimeter, each cell comprising a soft inner portion and a relatively firm outer portion, the firm outer portion of the cells being fused peripherally to the firm outer portoins of adjacent cells to form a continuous grid, the peripherally fused outer portions of adjacent cells comprising connection zones that constitute more frangible sections within the structure of the bakery product at which breakage of the product may occur during consumption of the product.

* * * * *